United States Patent
Kodera

(10) Patent No.: US 11,752,968 B2
(45) Date of Patent: *Sep. 12, 2023

(54) NON-COATED AIR BAG FABRIC AND AIR BAG

(71) Applicant: SEIREN CO., LTD., Fukui (JP)

(72) Inventor: Shota Kodera, Fukui (JP)

(73) Assignee: SEIREN CO., LTD., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/498,278

(22) PCT Filed: Mar. 29, 2018

(86) PCT No.: PCT/JP2018/013199
§ 371 (c)(1),
(2) Date: Sep. 26, 2019

(87) PCT Pub. No.: WO2018/181695
PCT Pub. Date: Oct. 4, 2018

(65) Prior Publication Data
US 2020/0047704 A1    Feb. 13, 2020

(30) Foreign Application Priority Data
Mar. 31, 2017    (JP) ................. 2017-071127

(51) Int. Cl.
*B60R 21/235*    (2006.01)
*B60R 21/237*    (2006.01)
*D03D 1/02*    (2006.01)

(52) U.S. Cl.
CPC .......... *B60R 21/235* (2013.01); *B60R 21/237* (2013.01); *B60R 2021/23542* (2013.01); *D03D 1/02* (2013.01); *D10B 2331/04* (2013.01); *D10B 2505/124* (2013.01)

(58) Field of Classification Search
CPC ..................... B60R 21/235; D03D 1/02; D03D 2700/0133; D10B 2331/04; D10B 2505/124
See application file for complete search history.

(56) References Cited

U.S. PATENT DOCUMENTS

| | | | |
|---|---|---|---|
| 3,430,314 A * | 3/1969 | Sayers ..................... | D02G 1/18 28/156 |
| 6,134,759 A | 10/2000 | Saijo et al. | |
| 6,601,614 B1 | 8/2003 | Ishii | |
| 6,607,995 B1 * | 8/2003 | Takeuchi ........... | D03D 15/0083 442/216 |
| 9,822,471 B2 | 11/2017 | Ise | |
| 9,878,684 B2 * | 1/2018 | Tanaka ................... | D03D 11/00 |
| 10,760,188 B2 * | 9/2020 | Kodera .................... | D03D 1/02 |
| 2012/0225229 A1 * | 9/2012 | Ise ........................ | B60R 21/235 428/35.5 |
| 2013/0295811 A1 | 11/2013 | Shinmen et al. | |
| 2015/0368834 A1 * | 12/2015 | Ise ......................... | D06C 15/00 280/728.1 |
| 2018/0086300 A1 | 3/2018 | Yamada et al. | |
| 2018/0155855 A1 | 6/2018 | Shinmen et al. | |
| 2018/0363171 A1 * | 12/2018 | Naruko ............. | D03D 15/0027 |
| 2019/0153628 A1 | 5/2019 | Shinmen et al. | |
| 2020/0247348 A1 * | 8/2020 | Kodera ................ | B60R 21/235 |
| 2020/0263327 A1 | 8/2020 | Shinmen et al. | |

FOREIGN PATENT DOCUMENTS

| | | | |
|---|---|---|---|
| CN | 1231352 A | | 10/1999 |
| CN | 103154336 A | | 6/2013 |
| CN | 104870703 A | | 8/2015 |
| JP | 02139435 A | * | 5/1990 |
| JP | 5-16754 A | | 1/1993 |
| JP | 6-306728 A | | 11/1994 |
| JP | 6-316246 A | | 11/1994 |
| JP | 7-258940 A | | 10/1995 |
| JP | 9-277893 A | | 10/1997 |
| JP | 9-309396 A | | 12/1997 |
| JP | 2004-91942 A | | 3/2004 |
| JP | 2011-202340 A | | 10/2011 |
| JP | 5593010 B1 | | 9/2014 |
| JP | WO2014/098082 A1 | | 1/2017 |
| JP | WO2016/158287 A1 | | 1/2018 |
| WO | WO 01/09416 A1 | | 2/2001 |

OTHER PUBLICATIONS https://patents.google.com/patent/JP6582939B2/en?oq=20180363171 (Year: 2015).*

(Continued)

*Primary Examiner* — Arti Singh-Pandey
(74) *Attorney, Agent, or Firm* — Birch, Stewart, Kolasch & Birch, LLP

(57) ABSTRACT

Provided is a non-coated air bag fabric capable of solving problems regarding smoothness of a fabric surface while having low air permeability, and an air bag including the same. The non-coated air bag fabric according to the present invention includes a plurality of weft threads and a plurality of warp threads, in which the weft threads and the warp threads are constituted by multifilament threads in which polyethylene terephthalate fibers are used, the number of filaments in each of the multifilament threads is 122 to 242, and a warp/weft average MMD (a mean deviation of coefficient of friction) of a surface is 0.02 or less.

4 Claims, 6 Drawing Sheets

(56) References Cited

OTHER PUBLICATIONS https://patents.google.com/patent/JPH09277893A/en?oq=PCT%2fJP2018%2f013199 (Year: 1996).*
https://patents.google.com/patent/JP2004091942A/en?oq=PCT%2fJP2018%2f013199 (Year: 2002).*
https://patents.google.com/patent/JPH0790747A/en?oq=PCT%2fJP2018%2f036070 (Year: 1993).*
https://www.fashiontrendsetter.com/downloads/Fiber_Dictionary.pdf see definition under woven (Year: 2001).*
International Search Report issued in PCT/JP2018/013199 (PCT/ISA/210), dated Jun. 5, 2018.
Written Opinion of the International Searching Authority issued in PCT/JP2018/013199 (PCT/ISA/237), dated Jun. 5, 2018.
Extended European Search Report dated Oct. 29, 2020 for Application No. 18778278.4.
Chinese Office Action and Search Report for Chinese Application No. 201880021923.1, dated Jun. 1, 2021, with an English translation.
Japanese Office Action for Japanese Application No. 2019-610114, dated Nov. 2, 2021, with an English translation.
Chinese Office Action for Chinese Application No. 201880021923.1, dated Jul. 14, 2022, with an English translation thereof.
Chunjing Gao, "Testing and information feedback on imported synthetic jute," Qingdao Ocean University Publishing House, May 31, 1993 (14 pages).
Chinese Office Action and Search Report for Chinese Application No. 201880021923.1, dated Feb. 7, 2022, with English translation.
Japanese Office Action for Japanese Application No. 2019-510114, dated May 17, 2022, with English translation.

\* cited by examiner

NON-COATED AIR BAG FABRIC AND AIR BAG

TECHNICAL FIELD

The present invention relates to a non-coated air bag fabric and an air bag made using the same.

BACKGROUND ART

Air bag devices are commonly provided in a vehicle as a safety device for occupant protection that protects an occupant from impact upon vehicle collision. Conventionally, in order to prevent gas released from an inflator from leaking from the bag, coated fabric was mainly used, but fabric needs to be light in weight due to demands for improvements in fuel consumption and the like and needs to be compactly housed due to trends in steering wheel design and the like, and thus non-coated cloth has been widely adopted.

Also, an air bag made of nylon 66 (PA66) was mainstream, but an air bag made of polyethylene terephthalate (PET) is beginning to be adopted for the purpose of reducing cost.

However, there is the issue that polyethylene terephthalate having a higher modulus than nylon 66 has poor flexibility and bag storability is insufficient. Also, there is the issue that a gap tends to form in the thickness direction between weaving threads due to a high modulus, and low air permeability is unlikely to be achieved.

To address these issues, Patent Literature 1 discloses a technique regarding a non-coated fabric for an air bag that exhibits good storability and expansion responsiveness and in which the fineness of filaments constituting the fabric, the single fiber fineness of filaments, the amount of fibers per unit area, air permeability, thickness, and a bending resistance measured using a cantilever method are defined.

Also, Patent Literature 2 discloses a technique by which a flexible fabric that has little fuzz and thread breakage, foldability, and low air permeability is obtained by forming a fiber structure using a composite fiber yarn obtained using sea-island composite spun yarn and then forming extremely fine fibers using the fiber structure.

Also, Patent Literature 3 discloses a woven cloth for an air bag in which multifilaments having a total fineness of 220 D or more and less than 450 D, a single yarn fineness of 0.6 d or more and less than 3 d, a strength of 8.0 g/d or more, elongation of 12.0% or more, and an degree of entanglement of 20 or more are used, and a cover factor K of this cloth is 2000 or more.

Lastly, Patent Literature 4 discloses a woven cloth for an air bag in which an asymmetry R (R=Φa/Φb) of the radius of curvature Φ of an intersecting portion where a warp thread and a weft thread are in contact with each other on the cross section of a fabric on the front and back of the fabric is in a range of 1.05 to 1.50.

CITATION LIST

Patent Literature

Patent Literature 1: JP H9-309396A
Patent Literature 2: JP H7-258940A
Patent Literature 3: JP H6-306728A
Patent Literature 4: Japanese Patent No. 5593010

SUMMARY OF INVENTION

Technical Problem

However, the non-coated fabric for an air bag disclosed in Patent Literature 1 has an air permeability of 0.5 to 3.0 ml/cm2·sec obtained using a Frazier method (0.9 ml/cm2·sec or more obtained using a Frazier method in working examples), which cannot be considered low air permeability. Thus, this non-coated fabric for an air bag is not sufficient in terms of performance as a fabric for an air bag.

Also, the air permeability of the fabric disclosed in Patent Literature 2 cannot be considered low (0.7 ml/cm2·sec or more obtained using a Frazier method in working examples), and the cost of the raw yarn is high due to a sea-island composite yarn being used as the raw yarn, and the manufacturing cost is also high due to the need for processing to remove the sea component. Furthermore, there is a possibility that flame retardancy will decrease if processing to remove the sea component is insufficient, and thus this fabric is not suitable as a fabric for an air bag.

Also, the cloth disclosed in Patent Literature 3 has a risk that single yarn breakage will occur at the time of production of the raw yarn due to this cloth having a high degree of interlacing, and thus the number of thread filaments cannot be increased, and there is a limit to the improvement of flexibility.

Also, in the air bag disclosed in Patent Literature 4, one side is calendered and the other side is not smooth, and thus it is not preferable that the unsmooth side faces an occupant. Meanwhile, there has been a problem that, if the unsmooth side faces the inflator side (inward), flow of gas will be affected at the time of deployment.

An object of the present invention is to provide a non-coated air bag fabric capable of solving problems regarding smoothness of fabric surfaces while having low air permeability, and an air bag including the same.

Solution to Problem

That is, in a non-coated air bag fabric according to one aspect of the present invention, weft threads and warp threads are constituted by multifilament threads in which polyethylene terephthalate fibers are used, and the number of filaments in each of the multifilament threads is 122 to 242, and a warp/weft average MMD (a mean deviation of coefficient of friction) of a surface is 0.02 or less.

In the above-described non-coated air bag fabric, the polyethylene terephthalate fibers may be raw threads.

The above-described non-coated air bag fabric may have a weave density of 200/dm to 295/dm inclusive.

The above-described non-coated air bag fabric may have a cover factor of 2300 to 2800.

In the above-described non-coated air bag fabric, the multifilament threads may have a single fiber fineness of 1.0 to 3.5 dtex.

An air bag according to one aspect of the present invention is formed using any one of the above-described non-coated air bag fabrics.

Advantageous Effects of Invention

According to the present invention, it is possible to provide a non-coated air bag fabric and an air bag that have excellently low air permeability and little effect on gas flow at the time of deployment, and by which flexibility of the bag and bag storability are improved.

DESCRIPTION OF EMBODIMENTS

Figure 1:
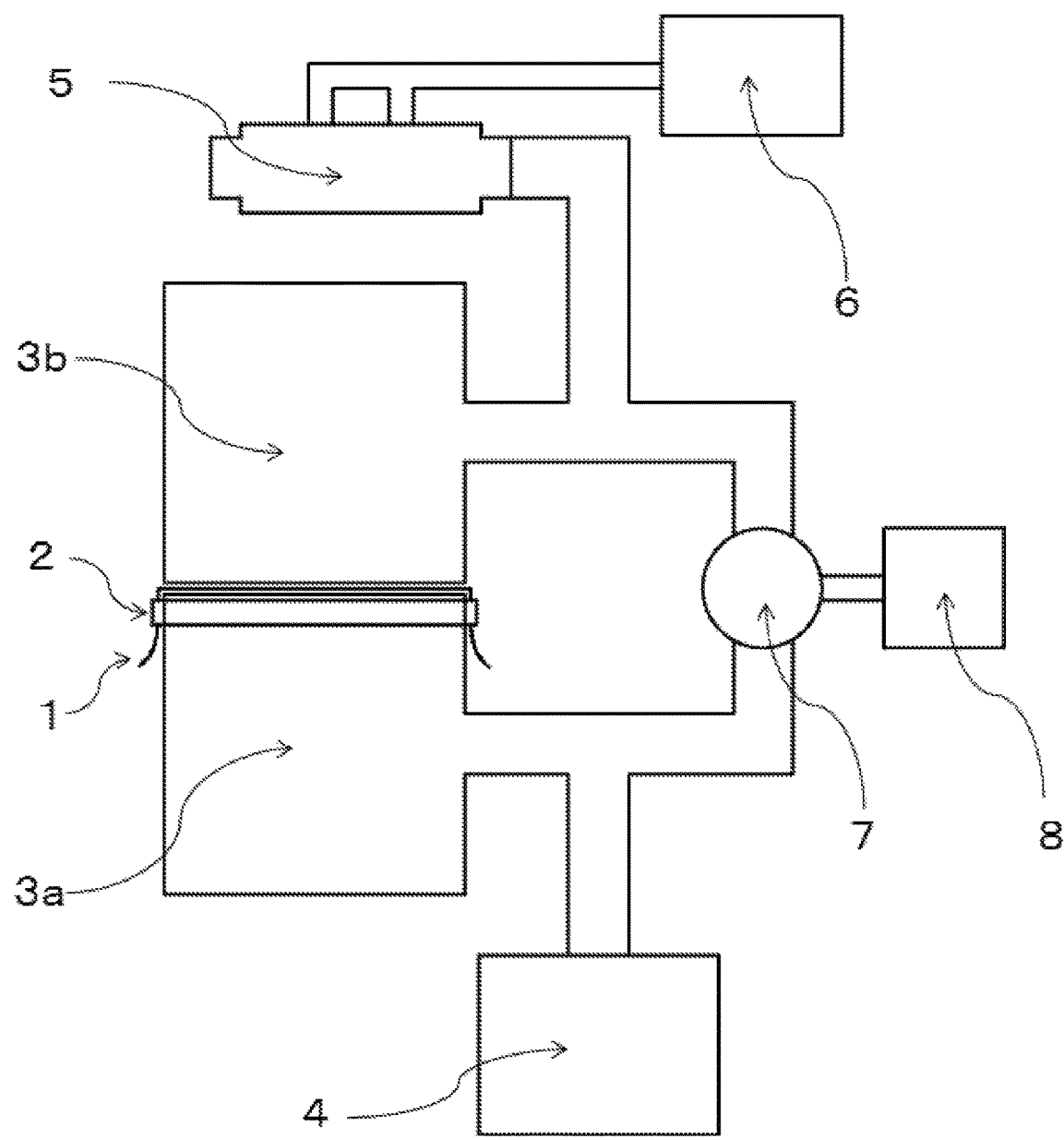
FIG. 1 is a schematic diagram of a greige air permeability measurement apparatus.
Figure 2:
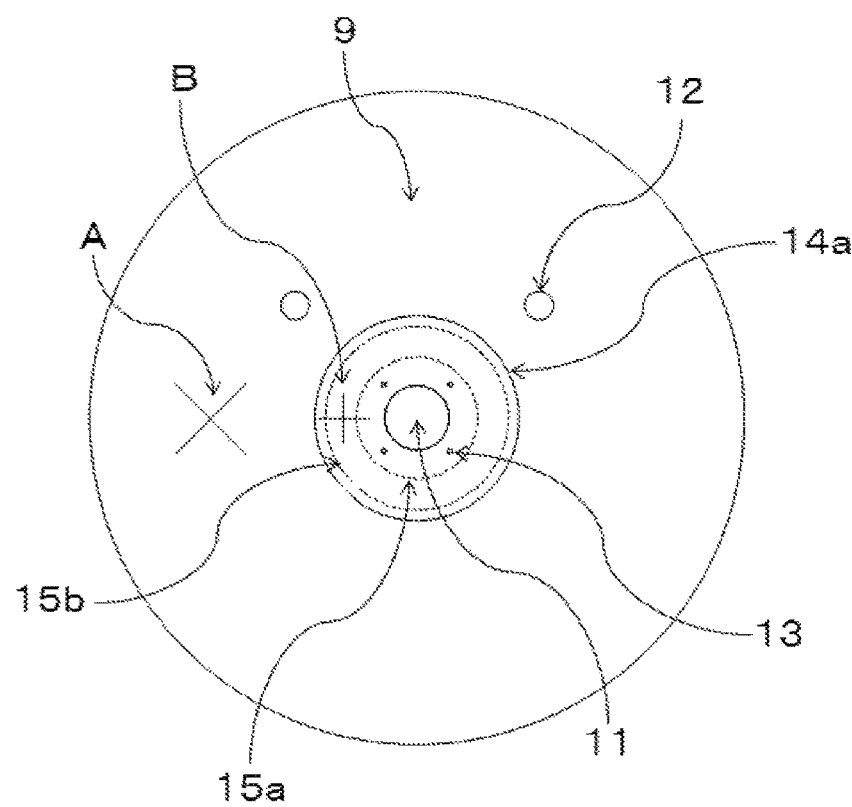
FIG. 2 is a front view showing a state in which three pieces of annular cloth are sewn to a mounting port-side main body base cloth of an air bag for evaluation.

The following describes embodiments of a non-coated air bag fabric according to the present invention and an air bag in which the non-coated air bag fabric is used. First, the non-coated air bag fabric will be described, and then the air bag in which this fabric is used will be described.

1. Non-Coated Air Bag Fabric 1-1. Overview of Fabric

Weft and warp threads of this fabric are formed using multifilament threads in which polyethylene terephthalate fibers are used. This fabric preferably has a density of 200/dm or more. As a result of setting the density to 200/dm or more, gaps between weaving threads are small and excellently low air permeability can be obtained. Also, it is preferable that the density is 295/dm or less because the flexibility of the fabric is unlikely to be impaired and good storability can be obtained. Note that, in terms of the weave density, a range of 50.8 threads/cm to 75 threads/cm inclusive is preferable.

Also, a cover factor (CF) can be defined as follows. The cover factor (CF) can be obtained by the product of weave densities N of the warp and the weft of a fabric and a total fineness D (dtex), and is expressed using the following equation.

$$CF = N_w \times \sqrt{D_w} + N_f \times \sqrt{D_f}$$

Here, Nw and Nf are weave densities (threads/2.54 cm) of the warp and the weft, and Dw and Df are total finenesses (dtex) of the warp and the weft.

Also, the cover factor is preferably 2300 to 2800, and more preferably 2400 to 2700. By setting the cover factor in this range, it is possible to obtain excellently low air permeability, good flexibility, productivity, and smoothness.

Threads that constitute the fabric of the present invention preferably have a total fineness of 380 dtex or more. If the total fineness of threads is 380 dtex or more, the strength of the fabric becomes superior as an air bag. Also, the total fineness is preferably 560 dtex or less, and more preferably 470 dtex or less because a lightweight fabric can be easily obtained.

With regard to the air permeability of the fabric of the present invention, air permeability that is measured using a Frazier method is preferably 0.5 ml/cm2·sec or less, and more preferably 0.3 ml/cm2·sec or less. By setting the air permeability to be the above-described value, if a base cloth for an air bag is formed using the fabric of the present invention, gas leakage from the surface of this base cloth is reduced and the size of an inflator can be reduced and the inflator can be quickly deployed. Also, the air flow rate under a differential pressure of 20 kPa is preferably 0.9 L/cm2·min or less. By setting the air flow rate in such a range, it is possible to deploy the air bag without losing gas ejected from the inflator. Also, it is possible to obtain a deployment speed that is appropriate to quickly protect an occupant.

The single fibers of the threads that constitute the fabric may have the same fineness or different finenesses, and preferably have a fineness of 1.0 to 3.5 dtex. By setting the fineness of the single fibers to 3.5 dtex or less, it is possible to increase the flexibility of the fabric, improve the foldability of the air bag, and also reduce the air permeability. Also, the fineness of the single fibers is preferably 1.0 dtex or more because the single fibers are unlikely to break in the spinning process, the weaving process, or the like.

Also, it is sufficient that the cross-sectional shape of a single fiber is selected from a circle, an ellipse, a flattened shape, a polygon, a hollow shape, other variants, and the like. It is sufficient to use mixed fibers, doubling threads, combined use threads, mixed use threads thereof (the warp and weft threads have different cross-sectional shapes), or the like as needed, and to appropriately select the cross-sectional shape to the extent that the spinning process, the fabric production process, the fabric physical properties, and the like are not hindered.

One or more of various additives that are normally used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer.

The texture of the fabric may be any of a plain weave, a basket weave, a grid weave (ripstop weave), a twill weave, a cord weave, a leno weave, a mock leno weave, and a composite texture thereof. Beside a two-axis design with warp and weft threads, a multi-axis design including axes that are inclined at 60 degrees may be adopted as needed, and in this case, the arrangement of threads need only be in conformity with the same arrangement of the warp or weft threads. Among these, plain weave is preferable in terms of ensuring the tightness of the structure, the physical properties, and the evenness of the performance.

1-2. Multifilament Thread

As described above, in the air bag fabric according to the present invention, weft threads and warp threads are formed using multifilament threads in which polyethylene terephthalate fibers are used.

The number of filaments in a multifilament thread is preferably 122 filaments to 242 filaments inclusive. The lower limit thereof is preferably 144 filaments or more, more preferably 160 filaments or more, and even more preferably 180 filaments or more. As a result of using such a multifilament thread, the fabric has good flexibility, and thus the smoothness of surfaces of the fabric is also improved. As a result, it is possible to obtain an air bag having excellently low air permeability and good storability. On the other hand, the upper limit of the number of filaments is preferably 220 filaments or less, and more preferably 200 filaments or less, in order to maintain the strength of the air bag. This is because, if the number of filaments is high, the fineness of single fibers (=total fineness/the number of filaments) is thin, and the strength is reduced.

1-3. Average MMD of Warp and Weft of Fabric Surface

In the present invention, it is important that an average MMD of the warp and the weft of a surface of the fabric is 0.02 or less. The warp/weft average MMD can be obtained from a mean deviation of the coefficient of friction (MMD) of a surface of the fabric in the warp and weft directions obtained using a KES method (Kawabata Evaluation System). Specifically, an average of MMDs in the warp direction and the weft direction is regarded as a warp/weft average MMD. It is preferable that the average MMD is 0.02 or less because, due to the smoothness of the surface being high, the fabric has little unevenness, and thus a portion that is in contact with an occupant is close to a surface instead of a point, as a result of which, in the case where the occupant collides with the fabric at the time of deployment of the air bag, flexibility and a low surface friction can be realized.

It is sufficient that the average MMD is 0.02 or less, and the average MMD is preferably as close as possible to 0. Also, although there is no limitation on a method for achieving an average MMD of 0.02 or less, multifilament threads with a high number of filaments are woven as the raw yarn, that is, in a non-twisted state, for example.

Use of a raw yarn reduces gaps between weaving threads, increases the degree of filling of the fabric, and achieves excellently low air permeability. Also, it is preferable that the number of filaments is high because the smoothness of the surface is improved, the flexibility is unlikely to be impaired, and good storability can be obtained.

In the present invention, the raw yarn refers to a non-twisted yarn, and a yarn on which no twisting process is performed as a process in particular. As a method for producing a non-twisted yarn that can be used in the present invention, it is preferable to interlace threads through an interlacing process, and the degree of entanglement at this time is more preferably 20 or less. Due to the degree of entanglement being 20 or less, pressure required to perform interlacing can be reduced, and even if the fineness of single fibers is thin, single fiber (single thread) breakage can be reduced, a yarn has little fuzz and a decrease in the strength of a raw yarn is suppressed.

The degree of entanglement can be obtained as follows, for example. Water is introduced into a container, and an interlaced yarn is caused to float on the water surface. Next, a reflecting rod emitting a color different from that of the interlaced yarn is disposed below the interlaced yarn, and an interval between the interlaced yarn and the reflecting rod is set to 1 to 5 mm. Subsequently, the reflecting rod is irradiated with light emitted from a light source located above the container so as to reflect the light, and the number of interlaced portions of the interlaced yarn is measured visually to obtain the degree of entanglement.

1-4. Characteristics

As described above, in the non-coated air bag fabric according to the present invention, the weft threads and the warp threads are formed using multifilament threads in which polyethylene terephthalate fibers are used. Also, the number of filaments in this multifilament thread is 122 to 242 filaments. Also, the warp/weft average MMD (a mean deviation of the coefficient of friction) of a surface of this fabric is 0.02 or less.

In this manner, because the number of filaments is moderately high and the warp/weft average MMD is lower than a predetermined value, threads in the fabric have a high filling degree (the number of gaps is low), air permeability is low, and the surface of the base cloth has little unevenness. Also, because the number of filaments is moderately high and flexibility is increased, the base cloth can be easily folded. Thus, an effect on the gas flow at the time of deployment of the bag is reduced on the inner surface of the bag due to good flexibility and storability being realized while air permeability being low, and the fabric surface being smooth. On the other hand, on the outer surface of the bag, it is possible to prevent defects resulting from friction at the time of deployment of the bag.

Also, if the number of multifilaments is moderately increased and a fabric is woven at a moderate density, the fabric has high slip resistance and the number of openings of stitches of sewing portions of the bag at the time of deployment is reduced. As a result, it is possible to reduce gas leakage from the sewing portions when the bag is formed.

2. Air Bag

An air bag of the present invention can be obtained by joining at least one main body base cloth obtained by cutting the above-described fabric of the present invention into a desired shape. Although all of pieces of a base cloth that constitutes the air bag are preferably constituted by the fabric, the present invention is not limited thereto, and a bath cloth formed using another fabric may also be used in a portion thereof. Also, it is sufficient to select the specifications, shape, and volume of the air bag in accordance with the site at which the air bag is to be disposed, the application, housing space, performance of absorbing occupant impact, the output of the inflator, and the like. Furthermore, a reinforcement cloth may be added according to required performance, and a non-coated fabric that is equivalent to the main body base cloth, a non-coated fabric that is different from the main body base cloth, or a coated fabric that is different from the main body base cloth may be selected as the base cloth used as the reinforcement cloth.

Although joining of the main body base cloths, joining of a main body base cloth and a reinforcement cloth or a hanging string, and fixing of other cut base cloths are performed mainly by sewing, it is possible to use partial adhesion, welding, or the like in combination, or use a joining method employing weaving or knitting as long as the air bag has satisfactory durability, impact resistance at the time of deployment, performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewing portion is not long, sewing may be performed using a single-needle sewing machine a plurality of times. If a plurality of base cloths are used as an air bag body, a plurality of base cloths may be sewn together in a stacked state, or sewn together one by one.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine containing, vinylon, aramid, carbon, glass, and steel threads, and any of spun yarn, filament twisted yarn, or a filament resin processed yarn may be used.

Furthermore, in order to prevent gas leakage from stitches of outer circumferential sewing portions or the like, a sealing material, an adhesive, an adhering material, or the like may be applied to, sprayed onto, or stacked on upper portions and/or lower portions of stitches, gaps between stitches, a margin to seam, or the like.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the airbag of the present invention can be applied in multiple applications such as ships, railroad trains, electric railcars, aircraft, and amusement park equipment.

WORKING EXAMPLES

Hereinafter, the present invention will be more specifically described based on working examples, but the present invention is not limited to these working examples. Note that methods for evaluating working examples and comparative examples and a method for producing an air bag will be described, and then evaluations of working examples and comparative examples will be described.

Total Fineness of Threads

Measurement was performed in conformity with method B in JIS L 1013 8.3.1.

Number of Thread Filaments

Measurement was performed in conformity with JIS L 1013 8.4.

Single Fiber Fineness

The single fiber fineness was obtained by dividing the total fineness of threads by the number of thread filaments.

Weave Density of Fabric

Measurement was performed in conformity with method A in JIS L 1096 8.6.1.

Cover Factor

Cover factors were obtained as described in the above-described embodiment.

Thickness of Fabric

Measurement was performed in conformity with method A in JIS L 1096 8.4. The thickness of a fabric is preferably 0.30 mm or less.

Air Permeability of Fabric 1

Measurement was performed in conformity with method A (Frazier method) in JIS L 1096 8.26.1.

Air Permeability of Fabric 2

The air flow rate of the obtained fabric under a differential pressure of 20 kPa was measured using a greige air flow rate measurement device (manufactured by KYOTOSEIKO CO., LTD.) shown in FIG. 1.

Specifically, first, a sample was obtained by cutting the obtained fabric into a 20 cm×20 cm piece. Next, as shown in FIG. 1, Sample 1 was fixed, using a ring-shaped fastener 2, to a tubular first clamp 3a having an inner diameter of 50 mm that was connected to a pressure device 4, and was held between the first clamp 3a and a tubular second clamp 3b having an inner diameter of 50 mm that was connected to the laminar flow tube (LF2-100L manufactured by COSMO INSTRUMENTS CO., LTD.) 5. Then, a pressure was applied to Sample 1 from the first clamp 3a side using the pressure device 4, and a pressure adjustment valve was operated such that the pressure gauge (DP-330BA manufactured by COSMO INSTRUMENTS CO., LTD.) 8 displayed 20 kPa. The flow rate of air passing through the sample in the above-described state was detected using the flowmeter 6 (DF2810P manufactured by COSMO INSTRUMENTS CO., LTD.) that was connected to the laminar flow tube 5, and the detected value was regarded as the air flow rate under a differential pressure of 20 kPa.

Warp/Weft Average MMD of Fabric Surface (Mean Deviation of Coefficient of Friction)

Measurement was performed on a surface of the obtained fabric using a surface testing machine (KES-FB4-A) manufactured by KATO TECH CO., LTD. Specifically, first, a sample was obtained by cutting the obtained fabric into a 10 cm×10 cm piece. Then, the sample was set in the surface testing machine, a numerical representation of MMD (a mean deviation of the coefficient of friction) of a surface of the sample in the warp and weft directions was obtained, and an average value of MMDs in the warp and the weft, which is an index in which the smaller the value is, the smoother and more even the surface of the sample is, was regarded as an average MMD.

Openings of Stitches of Fabric

Two samples obtained by cutting the obtained fabric into 10 cm×10 cm pieces were stacked on each other. Then, a sample was prepared by lock stitching the two stacked samples with a stitch count of 35 stitches at a margin to the seam of 1.5 cm using a nylon sewing thread having a total fineness of 1440 dtex. The obtained sample was held by a chuck of a tensile testing machine (Instron), and openings of the stitches at a load of 50 kgf and 3 cm was evaluated using an electronic caliper. Due to gas from the inflator, a load acts on the sewing portions of an air bag and stitches thereof expand, and thus how far stitches expand is predicted through this test. An opening of a stitch is preferably 2.0 mm or less, and if the opening is larger than 2.0 mm, there is a risk that gas leakage will occur.

Method for Producing Air Bag for Evaluation

A method for producing an air bag for evaluation will be described below with reference to FIGS. 2 to 5. A first circular main body base cloth 9 having a diameter of 702 mm and a second circular main body base cloth 10 having a diameter of 702 mm were cut from a prepared fabric. The main body base cloth 9 was provided, at its central portion, with an inflator mounting port 11 having a diameter of 67 mm and two air outlets 12 having a diameter of 30 mm at two positions (left and right pair) located 125 mm upward of and 115 mm respectively to the left and right from the center of the mounting port 11. Furthermore, the first main body base cloth 9 was provided with bolt fixing holes 13 having a diameter of 5.5 mm at positions located 34 mm upward and downward of and 34 mm to the left and to the right from the center of the mounting port 11 (see FIG. 2).

Figure 3:
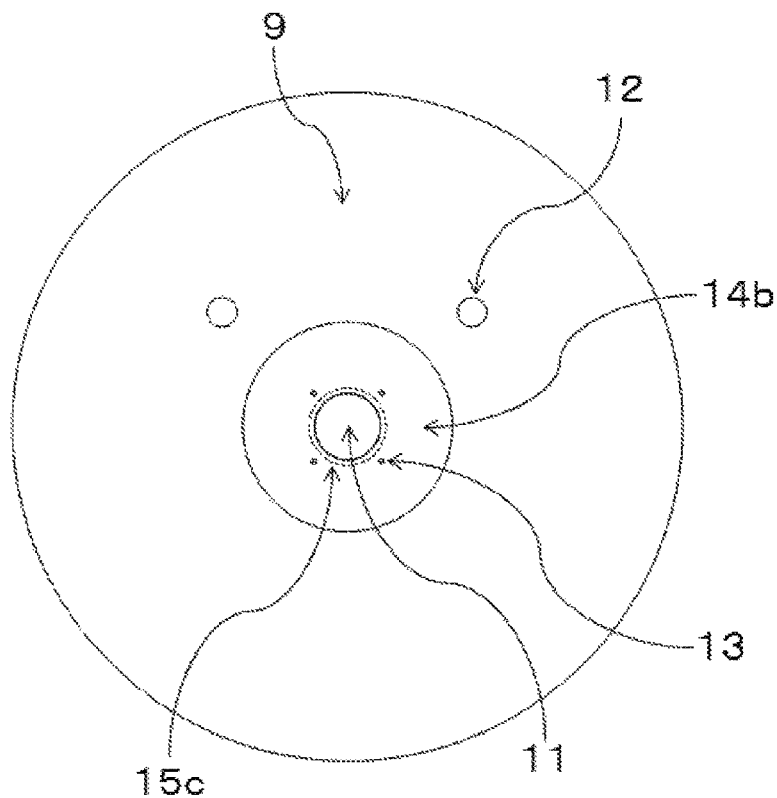
FIG. 3 is a front view showing a state in which four pieces of annular cloth are sewn to a mounting port-side main body base cloth of an air bag for evaluation.

Also, a non-coated base cloth that was produced using 470 dtex, 72f nylon 66 fibers and had a weave density of 53/2.54 cm and a coated base cloth that was obtained by coating a base cloth that was produced using 470 dtex, 72f nylon 66 fibers and had a weave density of 46/2.54 cm, with a silicone resin at 45 g/m2 were prepared as the reinforcement cloths. As the reinforcement cloths for the inflator mounting port 11 of the first main body base cloth 9, three pieces of first annular cloth 14a having an outer diameter of 210 mm and an inner diameter of 67 mm were cut from the non-coated base cloth, and one piece of second annular cloth 14b having the same shape as the annular cloth 14a was cut from the coated base cloth. All of the pieces of annular cloth 14a and 14b were provided with bolt fixing holes having a diameter of 5.5 mm. Next, the three pieces of first annular cloth 14a were overlaid on the first main body base cloth 9 such that the weaving direction of the reinforcement cloth was rotated by 45 degrees with respect to the weaving direction of the main body base cloth 9 (see weaving directions A and B in FIG. 2) and the positions of the bolt fixing holes coincided with each other. The overlaid pieces of first annular cloth 14a were sewn in a circular shape at positions at a diameter of 126 mm (sewing portion 15a) and at a diameter of 188 mm (sewing portion 15b). Similarly to the pieces of annular cloth 14a, the piece of second annular cloth 14b was overlaid thereon with the same weaving direction as the pieces of annular cloth 14a from the above, and the four pieces of annular cloth 14a and 14b were sewn to the first main body base cloth 9 in a circular shape at a position at a diameter of 75 mm (sewing portion 15c). The first main body base cloth 9 after sewing is shown in FIG. 3. Note that the pieces of annular cloth 14a and 14b were seamed with the main body base cloth 9 through lock stitching using a nylon 66 sewing thread with the needle thread being 1400 dtex and the bobbin thread being 940 dtex with a stitch count of 3.5 stitches/cm.

Figure 4:
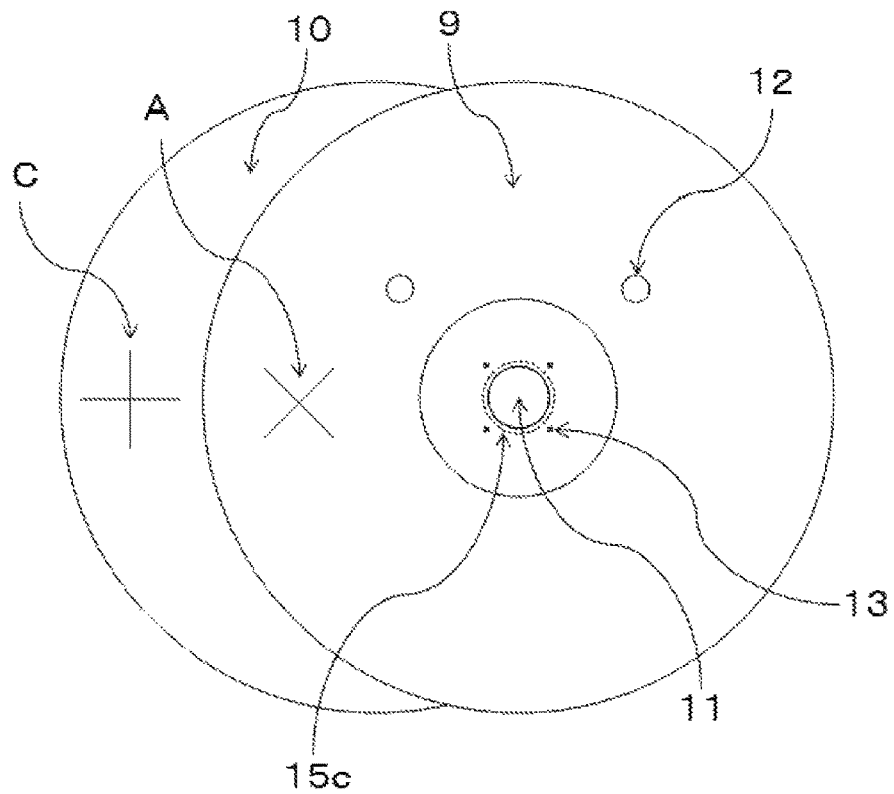
FIG. 4 is a front view showing the manner in which the mounting port-side main body base cloth of the air bag for evaluation and an occupant-side main body base cloth are stacked.
Figure 5:
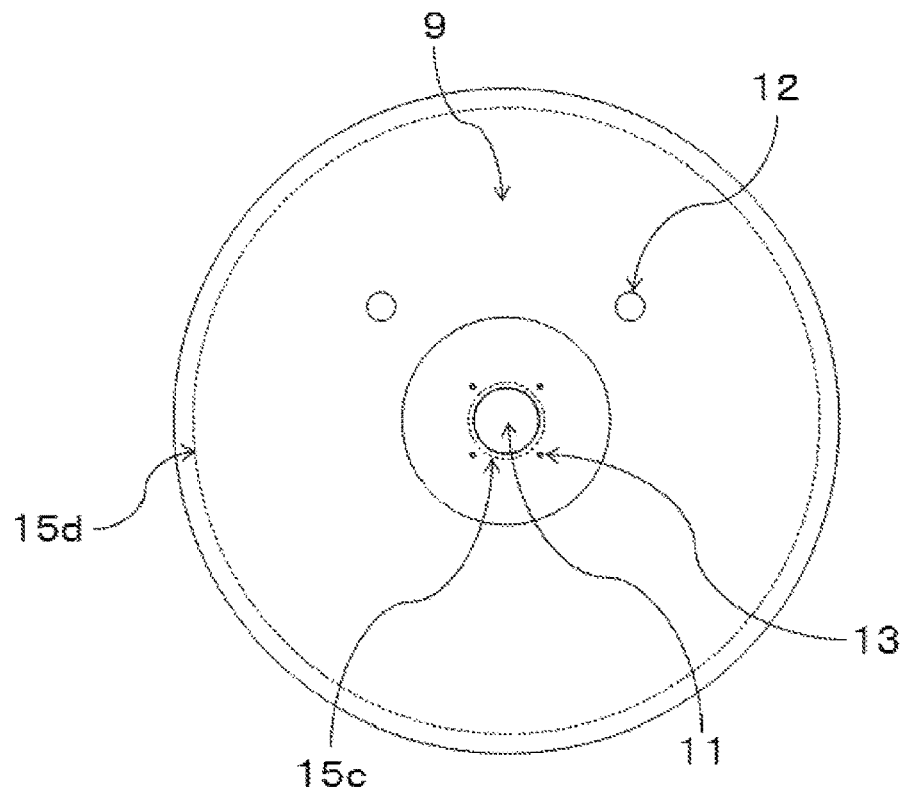
FIG. 5 is a front view showing a state in which the mounting port-side main body base cloth of the air bag for evaluation and an occupant-side main body base cloth are sewn together.

Next, both the main body base cloths 9 and 10 were overlaid on each other. At that time, the two main body base cloths 9 and 10 were stacked such that the surfaces of the main body base cloths, with which the pieces of annular cloth 14a and 14b were seamed, were located outside and the weaving direction of the first main body base cloth 9 was rotated by 45 degrees with respect to the weaving direction of the second main body base cloth 10 (FIG. 4). Furthermore, outer circumferential portions thereof were sewn together through double thread chain stitching with two rows (sewing portion 15d) at a distance between stitch lines of 2.4 mm and a margin to the seam of 13 mm. The sewn state is shown in FIG. 5. The bag was drawn out from the mounting port 11, and the inside and the outside were inverted after sewing so as to obtain a circular air bag having an inner diameter ø of 676 mm. A sewing thread the same as the above-described thread used in lock stitching was used as the sewing thread for sewing the outer circumferential portions.

Air Bag Storability (Foldability) Evaluation

Figure 6:
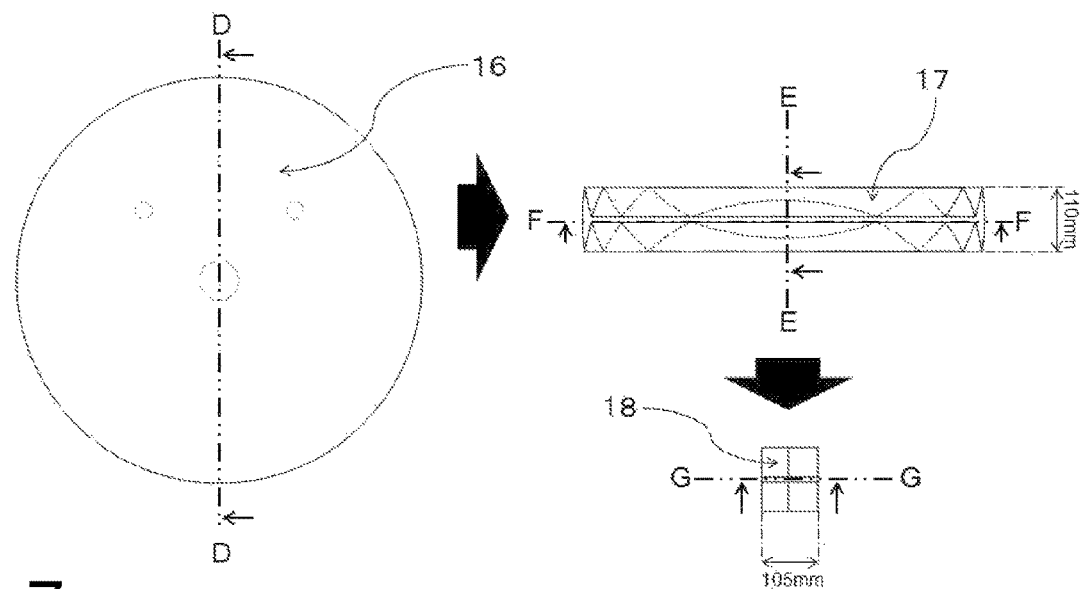
FIG. 6 is a front view of an air bag for evaluation, illustrating a folding procedure in a foldability evaluation test.
Figure 7:
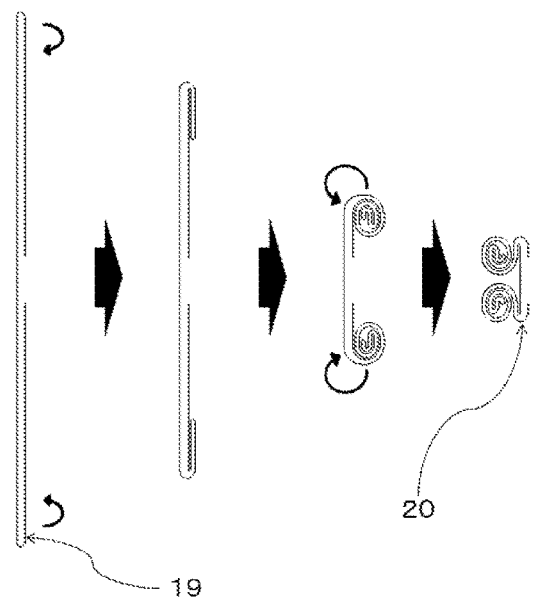
FIG. 7 is a cross-sectional view showing a folding method in the foldability evaluation test.
Figure 8:
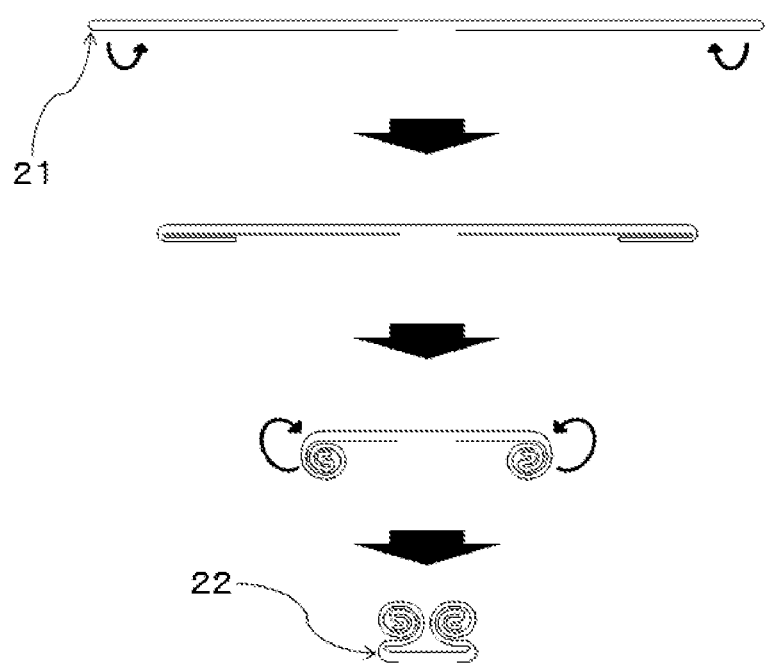
FIG. 8 is a cross-sectional view showing the folding method in the foldability evaluation test.

The air bag that was produced using the above-described method was folded following the procedures shown in FIGS. 6 to 8. FIG. 6 is a diagram showing a procedure used when an air bag for evaluation is folded with the occupant side being the front. FIG. 7 is a cross-sectional view of the air bag for evaluation taken along line D-D, showing a procedure used when a pre-folding initial form 16 is folded into an intermediate form 17. The cross-sectional view taken along line E-E of the intermediate form 17 shown in FIG. 6 is a final form 20 shown in FIG. 7. FIG. 8 is a cross-sectional view of the air bag for evaluation taken along line F-F, showing a procedure used when the intermediate form 17 is folded into a completely folded form 18. The cross-sectional view of the completely folded form 18 taken along line G-G shown in FIG. 6 is a final form 22 shown in FIG. 8.

Figure 9:
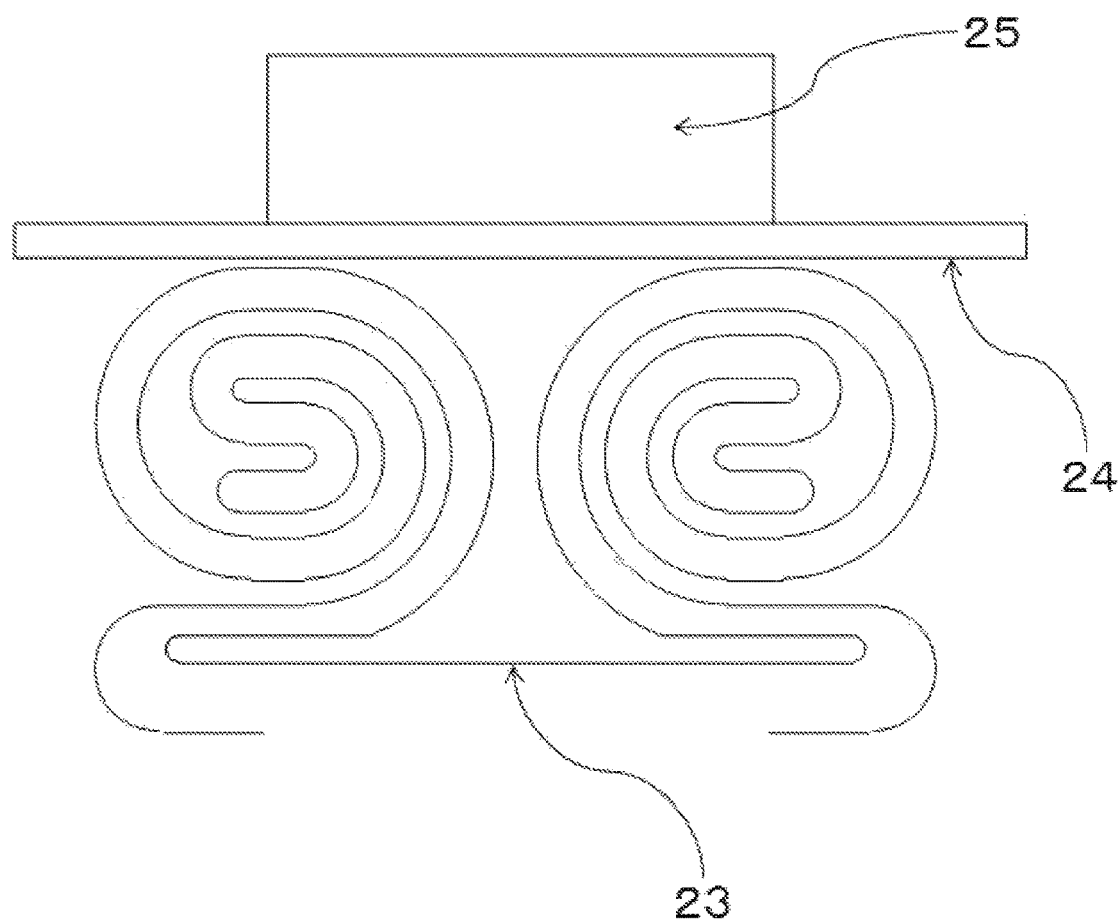
FIG. 9 is a cross-sectional view showing the folding method in the foldability evaluation test.

While the air bag was being folded, adjustment was performed such that the width of the intermediate form 17 was 110 mm, and the width of the completely folded form 18 was 105 mm. Then, as shown in FIG. 9, a 130 mm×130 mm×2 mm aluminum plate 24 was placed on the folded air bag 23. The height of the folded air bag 23 was measured in a state in which a 1-kg weight 25 was placed thereon. Evaluation was made according to the magnitude of the height after folding, and the case where the height was 45 mm or more was evaluated as B, and the case where the height was less than 45 mm was evaluated as A. Note that 45 mm is a value made in consideration of a space for housing a normal air bag.

Next, working examples and comparative examples will be described. The following describes air bag fabrics according to Working Examples 1 to 3 and Comparative Examples 1 and 2, and the above-described evaluations made on air bags that were produced using these non-coated air bag fabrics. The results are shown in Table. 1. Note that multifilaments were formed using raw threads (interlaced products) in working examples and comparative examples.

Working Example 1

A plain woven fabric was produced using polyethylene terephthalate threads having a total fineness of 470 dtex, a filament number of 182, and a single fiber fineness of 2.6 dtex for the warp and the weft. Then, scouring and setting were performed so as to obtain a fabric in which the warp had a weave density of 224/dm and the weft had a weave density of 224/dm. The obtained fabric had a cover factor of 2471 and had an MMD of 0.0138. When the air permeability of this fabric was measured, the fabric had a very low air permeability of 0.19 mL/cm2·sec obtained using a Frazier method and 0.68 L/cm2·min under a differential pressure of 20 kPa. Also, an air bag for evaluation was produced using this fabric, and when storability evaluation was made, the storability was 40.0 mm, and the air bag for evaluation was compactly folded.

Working Example 2

A plain woven fabric was produced using polyethylene terephthalate threads having a total fineness of 470 dtex, a filament number of 144, and a single fiber fineness of 3.3 dtex for the warp and the weft. Then, scouring and setting were performed so as to obtain a fabric in which the warp had a weave density of 224/dm and the weft had a weave density of 224/dm. The obtained fabric had a cover factor of 2471 and had an MMD of 0.0161. When the air permeability of this fabric was measured, the fabric had a very low air permeability of 0.29 mL/cm2·sec obtained using a Frazier method and 0.79 L/cm2·min under a differential pressure of 20 kPa. Also, an air bag for evaluation was produced using this fabric, and when foldability evaluation was made, the foldability was 44.0 mm, and the air bag for evaluation was compactly folded.

Working Example 3

A plain woven fabric was produced using polyethylene terephthalate threads having a total fineness of 470 dtex, a filament number of 182, and a single fiber fineness of 2.6 dtex for the warp and the weft. Then, scouring and setting were performed so as to obtain a fabric in which the warp had a weave density of 244/dm and the weft had a weave density of 236/dm. The obtained fabric had a cover factor of 2602 and had an MMD of 0.0161. When the air permeability of this fabric was measured, the fabric had a low air permeability of 0.10 mL/cm2·sec obtained using a Frazier method and 0.42 L/cm2·min under a differential pressure of 20 kPa. Also, an air bag for evaluation was produced using this fabric, and when foldability evaluation was made, the foldability was 43.5 mm, and the air bag for evaluation was compactly folded.

Comparative Example 1

A plain woven fabric was produced using polyethylene terephthalate threads having a total fineness of 550 dtex, a filament number of 96, and a single fiber fineness of 5.7 dtex for the warp and the weft. Then, scouring and setting were performed so as to obtain a fabric in which the warp had a weave density of 209/dm and the weft had a weave density of 209/dm. The obtained fabric had a cover factor of 2493 and had an MMD of 0.0292. When the air permeability of this fabric was measured, the fabric had an air permeability of 0.25 mL/cm2·sec obtained using a Frazier method and 0.82 L/cm2·min under a differential pressure of 20 kPa. Also, an air bag for evaluation was produced using this fabric, and when foldability evaluation was made, the foldability was 56.4 mm, and the air bag for evaluation was not compactly folded. It is conceivable that this is because the fabric did not have flexibility and unevenness of the surface was increased due to having a small number of filaments and a large MMD.

Comparative Example 2

A plain woven fabric was produced using polyethylene terephthalate threads having a total fineness of 560 dtex, a filament number of 96, and a single fiber fineness of 5.83 dtex for the warp and the weft, and scouring and setting were performed so as to obtain a fabric in which the warp had a weave density of 224/dm and the weft had a weave density of 224/dm. The obtained fabric had a cover factor of 2471 and had an MMD of 0.0285. When the air permeability of this fabric was measured, the fabric had a sufficient air permeability of 0.43 mL/cm2·sec obtained using a Frazier method, but had a large air permeability of 0.94 L/cm2·min under a differential pressure of 20 kPa, and thus the fabric exhibited concerning air permeability in terms of the performance of an air bag. Also, an air bag for evaluation was produced using this fabric, and when foldability evaluation was made, the foldability was 50.5 mm, and the air bag for evaluation was not compactly folded. It is conceivable that this is because the fabric did not have flexibility and unevenness of the surface was increased due to having a small number of filaments and a large MMD.

Comparative Example 3

A plain woven fabric was produced using nylon 66 threads having a total fineness of 470 dtex, a filament number of 144, and a single fiber fineness of 3.3 dtex for the warp and the weft. Then, scouring and setting were performed so as to obtain a fabric in which the warp had a weave density of 209/dm and the weft had a weave density of 209/dm. The obtained fabric had a cover factor of 2298 and had an MMD of 0.04. When the air permeability of this fabric was measured, the fabric had an air permeability of 0.07 mL/cm2·sec obtained using a Frazier method and 0.27 L/cm2·min under a differential pressure of 20 kPa. Also, an air bag for evaluation was produced using this fabric, and when foldability evaluation was made, the foldability was 48.5 mm, and the air bag for evaluation was not compactly folded. It is conceivable that this is because unevenness of the surface was increased due to having a large MMD and nylon 66 being used as fibers instead of polyethylene terephthalate.

TABLE 1

|  |  | Work. Ex. 1 | Work. Ex. 2 | Work. Ex. 3 | Comp. Ex. 1 | Comp. Ex. 2 | Comp. Ex. 3 |
| --- | --- | --- | --- | --- | --- | --- | --- |
| Material |  | PET | PET | PET | PET | PET | PA66 |
| Total Fineness | dtex | 470 | 470 | 470 | 550 | 470 | 470 |
| Filament Number | — | 182 | 144 | 182 | 96 | 96 | 144 |
| Single Fiber Fineness | dtex | 2.6 | 3.3 | 2.6 | 5.7 | 4.9 | 3.3 |
| Weave Density Warp | /dm | 224 | 224 | 244 | 209 | 224 | 209 |
| Weave Density Weft | /dm | 224 | 224 | 236 | 209 | 224 | 209 |
| Cover Factor | — | 2471 | 2471 | 2602 | 2392 | 2471 | 2298 |
| Thickness | mm | 0.29 | 0.30 | 0.30 | 0.31 | 0.30 | 0.31 |
| MMD | — | 0.0138 | 0.0161 | 0.0162 | 0.0292 | 0.0285 | 0.0400 |
| Air Permeability/ Frazier Method | ml/cm$^2$·sec | 0.19 | 0.29 | 0.10 | 0.25 | 0.43 | 0.07 |
| Air Permeability/ 20 kPa | L/cm$^2$·min | 0.68 | 0.79 | 0.42 | 0.82 | 0.94 | 0.27 |
| Opening of Stitch (room temperature · 50 kgf) | mm | 1.14 | 0.95 | 0.90 | 0.85 | 1.25 | 1.21 |
| Storability | mm | 40.0 | 44.0 | 43.5 | 56.4 | 50.5 | 48.5 |
|  | Evaluation | A | A | A | B | B | B |

LIST OF REFERENCE NUMERALS

1 Sample for measuring air permeability
2 Ring-shaped fastener
3a, 3b Tubular clamp
4 Pressure device
5 Laminar flow tube 6 Flowmeter
7 Pressure adjustment valve
8 Pressure gauge
9 Main body base cloth on mounting port side
10 Main body base cloth on occupant side
11 Inflator mounting port
12 Air hole
13 Bolt fixing hole
14a, 14b Annular cloth
15a, 15b, 15c, 15d Sewing portion
16 Pre-folding form
17 Form in folding intermediate state
18 Form in completely folded state
19 Cross-sectional view of 16 taken along line D-D
20 Cross-sectional view of 17 taken along line E-E
21 Cross-sectional view of 17 taken along line F-F
22 Cross-sectional view of 18 taken along line G-G
23 Air bag
24 Aluminum plate
25 Weight
A Weaving direction of main body base cloth 9
B Weaving direction of annular cloth 14a
C Weaving direction of main body base cloth 10

The invention claimed is:

1. A non-coated air bag fabric comprising:
a plurality of weft threads; and
a plurality of warp threads,
wherein the weft threads and the warp threads comprise a raw yarn of interlaced threads having a degree of entanglement of 20 or less, and constituted by multifilament threads in which polyethylene terephthalate fibers are used,
the fabric has a cover factor of 2400 to 2700,
the multifilament threads have a single fiber fineness of 2.6 to 3.3,
the thickness of the fabric is 0.30 mm or less,
the number of filaments in each of the multifilament threads is 122 to 242, and
a warp/weft average MMD (a mean deviation of a coefficient of friction) of a surface is 0.02 or less.

2. The non-coated air bag fabric according to claim 1, wherein the fabric has a weave density of 200/dm to 295/dm inclusive.

3. An air bag formed using the non-coated air bag fabric according to claim 1.

4. The non-coated air bag fabric according to claim 1, wherein the fabric has a cover factor of 2471 to 2602.

* * * * *